United States Patent [19]

Eguchi et al.

[11] 4,376,132

[45] Mar. 8, 1983

[54] SEASONING COMPOSITION HAVING CRAB MEAT FLAVOR

[75] Inventors: Hajime Eguchi, Yokohama; Hideko Furukawa, Tokyo; Tetsuya Kawakita, Yokohama, all of Japan

[73] Assignee: Ajinomoto Co., Ltd., Tokyo, Japan

[21] Appl. No.: 309,100

[22] Filed: Oct. 6, 1981

[51] Int. Cl.³ .................... A23L 1/221; A23L 1/228; A23L 1/229; A23L 1/231

[52] U.S. Cl. .................... 426/537; 426/429; 426/431; 426/437; 426/650; 426/655; 426/656; 426/657

[58] Field of Search ............... 426/650, 652, 655, 656, 426/657, 658, 429, 431, 437, 464, 537; 260/236.5

[56] References Cited

U.S. PATENT DOCUMENTS

| | | | |
|---|---|---|---|
| 2,170,954 | 8/1939 | Stange | 426/655 X |
| 2,571,867 | 10/1951 | Hall et al. | 426/655 X |
| 2,571,948 | 10/1951 | Sair et al. | 426/655 X |
| 3,264,116 | 8/1966 | Gray | 426/650 X |
| 3,524,747 | 8/1970 | O'Hara et al. | 426/650 X |
| 3,778,513 | 12/1973 | Shiga et al. | 426/650 X |
| 4,066,793 | 1/1978 | Eguchi | 426/650 X |
| 4,258,072 | 3/1981 | Eguchi et al. | 426/650 X |

FOREIGN PATENT DOCUMENTS

| | | | |
|---|---|---|---|
| 694776 | 9/1964 | Canada | 426/650 |
| 48-60 | 1/1973 | Japan | 426/655 |
| 54-41368 | 4/1979 | Japan | 426/650 |

*Primary Examiner*—Arthur L. Corbin
*Attorney, Agent, or Firm*—Oblon, Fisher, Spivak, McClelland & Maier

[57] ABSTRACT

A crab meat flavored seasoning composition, comprising:
 (a) not less than 50% by wt. of amino acids,
 (b) not less than 2% by wt. of 5'-nucleotides,
 (c) not less than 30% by wt. of inorganic salts,
 (d) not less than 1% by wt. of glucides and
 (e) a substantial amount of crab shell extract or synthetic crab aromatics; said amino acids comprising not less than 40% by wt. of glycine, not less than 40% by wt. of arginine and glutamic acid and not less than 10% by wt. of alanine, said 5'-nucleotides comprising not less than 50% by wt. of GMP and said inorganic salts comprising not less than 20% by wt. of potassium ion, not less than 40% by wt. of phosphate ion and not more than 40% by wt. of sodium and chlorine ions.

17 Claims, No Drawings

SEASONING COMPOSITION HAVING CRAB MEAT FLAVOR

BACKGROUND OF THE INVENTION

1. Field of the Invention

The present invention relates to a mixed or combination seasoning as a flavoring agent. More particularly, the present invention is concerned with a mixed seasoning, the flavor of which is almost the same as that of a broth extracted from crab meat or that of boiled crab meat.

2. Description of the Prior Art

Currently, there is an increasing need for crab meat flavored fish paste products, frozen foods, soups, snack foods and the like and the demand for crab meat is increasing. In the production of the above foods and beverages the manufacturers usually use canned crab meat. However, the high cost of canned crab meat is a mitigating factor which discourages more widespread use of crab meat flavored foodstuff items.

A study of the taste of boiled crab meat has been made recently by Konosu, S., et. al. and it has been reported that glycine, arginine, alanine, glutamic acid, sodium adenine-5'-monophosphate (AMP), sodium cytidine-5'-monophosphate (CMP), sodium guanosine-3'-monophosphate (GMP), sodium ion, chlorine ion, phosphate ion, potassium ion, and betaine are all indispensable components which contribute to the taste of boiled crab meat. (Hayashi, T., Yamaguchi, K. and Konosu, S.; 1978 Autumn Congress of the Japanese Society of Scientific Fisheries Abstracts P-122, No. 535; Hayashi, T., Yamaguchi, K. and Konosu, S.; Fifth International Congress of Food Science & Technology Abtracts P-159 (4B-09) (1978); Hayashi, T., Furukawa, H., Yamaguchi, K. and Konosu, S.; 1979 Spring Congress of Japanese Society of Scientific Fisheries Abstracts P-190, No. 635).

While it is true that a mixture of the twelve components listed above has a taste very similar to that of boiled crabs, the mixture is not always satisfactory when used as a flavoring or seasoning agent in various foods and beverages since it lacks both the thickness and scent which the boiled crab meat has all on its own and it also lacks the natural feeling of crab meat and its flavor.

A need, therefore, continues to exist for a mixed seasoning agent having a crab meat flavor which combines the scent, thickness and taste of boiled crab meat as such and can be adapted for practical use in various foods and beverages.

SUMMARY OF THE INVENTION

Accordingly, one object of the present invention is to provide a mixed seasoning agent which possesses a flavor similar to that of boiled crab meat to the extent that no difference between foods containing the mixed seasoning and foods based on boiled crab meat can be discerned in taste, scent, thickness or the like.

Another object of the present invention is to provide a practical mixed seasoning agent for various foods and beverages.

Briefly, this object and other objects of the present invention as hereinafter will become more readily apparent can be attained by a mixed seasoning composition formed from a combination of not less than 50% by wt. of amino acids, not less than 2% by wt. of 5'-nucleotides, not less than 30% by wt. of inorganic salts, not less than 1% by wt. of glucides and a substantial amount of crab shell extract or synthetic crab aromatics, said amino acids comprising not less than 40% by wt. of glycine, not less than 40% by wt. or arginine and glutamic acid and not less than 10% by wt. of alanine, said 5'-nucleotides comprising not less than 50% by wt. of GMP and said inorganic salts comprising not less than 20% by wt. of potassium ion, not less than 40% by wt. of phosphate ion and not more than 40% by wt. of sodium ion and chlorine ion.

DETAILED DESCRIPTION OF THE PREFERRED EMBODIMENTS

The first ingredient employed in the present mixed seasoning composition is the amino acid component. Glycine, arginine, alanine and glutamic acid are necessary constituents of the amino acid of the present composition. The first ingredient constitutes no less than 50% by wt. of the composition except for the crab shell extract and synthetic crab aromatics and comprises not less than 40% by wt. of glycine, not less than 40% by wt. of arginine and glutamic acid and not less than 10% by wt. of alanine. It has been found by the omission test that glycine contributes sweetness, tastiness and body to the compositions, glutamic acid contributes sweetness and tastiness to the composition and a composition without arginine has less sweetness and tastiness and more bitterness than boiled crab meat has. A composition with the four amino acids in lesser amounts than that of the present composition lacks the flavor of boiled crab meat and therefore cannot impart the flavor of boiled crab meat to foodstuffs.

The amino acids employed in the present invention may be obtained by any process such as fermentation, synthesis, extraction or hydrolysis of animal protein (HAP) or vegetable protein (HVP). Preferably, the amino acids contain no impurities or have only relatively minor amounts of impurities.

The presence of amino acids other than those listed above will not prevent the present composition from producing a crab meat flavor unless the four amino acids are present in the composition in an amount less than that described above. Economic sources of amino acids are soy bean hydrolysates, casein hydrolysates and gelatin hydrolysates. In the above cases, the hydrolysis product may be purified according to need, and the deficiencies of the four amino acids in a given product should be made-up to satisfy the amount described above.

The second ingredient of the present composition is a known flavor inducing 5'-nucleotide such as GMP, CMP, AMP or sodium inosine-5'-monophosphate (IMP). The 5'-nucleotide component must be present in the composition in an amount of not less than 2% by wt. of the composition except for the crab shell extract and synthetic aromatics. Among the 5'-nucleotides, GMP has to be present in an amount not less than 50% by wt. based on the total amount of 5'-nucleotides. When the content of GMP is over 50% by wt., the presence of other 5'-nucleotides is preferable, but not necessary.

As for the third ingredient, inorganic salts which given sodium ion, potassium ion, chlorine ion and phosphate ion when dissolved in water, for instance, NaCl, $KH_2PO_4$ or $K_2HOP_4$ may be used in the present seasoning composition. In order to achieve a crab meat flavor, it is necessary that the composition comprise not less than 20% by wt. of potassium ion, not less than 40% by wt. of phosphate ion and not more than 40% by wt. of sodium ion and chlorine ion.

Concerning the glucides as the fourth ingredient of the present composition, glucose is the most prefered ingredient, with other glucides such as inverted sugar, liquefied sugar or the like containing glucose also being preferred materials.

The fifth ingredient is a crab shell extract and/or synthetic crab aromatics. Crab shell extracts include material extracted from edible crabs, after separating the meat, by hot-water extraction, by organic solvent extraction with ethanol or another organic solvent, by dilute-acid extraction or the like. In the process of extraction, the crab shells are preferably crushed or pulverized prior to extraction.

In the hot-water extraction method, pulverized crab shells combined with 3-10 times the amount of water are boiled for 10-60 minutes and filtered thereby resulting in a solution containing crab shell extract. Thereafter, the crushed crab shell residue is washed in hot-water and the wash water is admixed with the solution obtained above, and a crab shell extract as the fifth ingredient of the present composition is obtained. In the ethanol extraction method, the residue is extracted with 2-6 times the amount of ethanol under refluxing conditions. In still another extraction technique all of the ingredients other than the crab shell extract are admixed with pulverized crab shells, and the mixture is then effectively extracted under heat to prepare an acceptable composition.

The content of the crab shell extract on a dry matter basis should be 2-20% by wt. of the total amount of the first to fourth ingredients. If less than 2% by wt., the amount of the crab shell extract present is not sufficient to achieve the objective of the present invention. On the other hand, more than 20% by wt. of the extract is disadvantageous from the economic point of view. When the extract is used in combination with the synthetic crab aromatic, the amount of extract should be changed according to the amount of synthetic aromatic used.

With regard to the synthetic crab aromatics, there are many kinds of aromatics commercially available in the form of liquids or solids, and there is no special limitation on the kind of synthetic crab aromatic employed in the present composition. A suitable aromatic, for example, which can be employed in the present invention is the powdered synthetic aromatic "AN-2547" (produced by T. Hasegawa Co.).

Any acceptable process for preparing the present composition can be used with no special restrictions on any process. An acceptable process is one in which all the ingredients in the form of powdered materials are mixed into the present composition. However, the scent of the composition obtained by simply mixing the powdered ingredients is weak and therefore, it is desirable to introduce a heating step into the preparation of the present composition to impart an efficient flavor or scent which the boiled crab meat has all on its own. One method of enhancing the flavor and scent of the composition is to prepare a seasoning solution containing all of the ingredients and then heating the solution at 80°-120° C. for 30-120 minutes. Accordingly, the method wherein the seasoning solution without crab shells is admixed with pulverized crab shells and extracted by heat is one of the more efficient methods for the preparation of the present composition. The seasoning solution obtained by the heat treatment can be used without any further treatment or it can be concentrated under reduced pressure into a paste. Alternatively, the solution can be converted into powder or granular form by adding a bulk imparting material such as dextrin.

The crab meat flavored compositions of the present invention has the same flavor quality as that of boiled crab meat and can be practically used for the preparation of various foods and beverages which are economical substitutes for natural crab meat products.

Having generally described this invention, a further understanding can be obtained by reference to certain specific examples which are provided herein for purposes of illustration only and are not intended to be limiting unless otherwise specified.

EXAMPLE 1

A 20 g amount of glycine, 20 g of L-arginine-L-glutamate, 5 g of DL-alanine, 12 g of gelatin hydrolysate (which contained 1.50 g of glycine, 0.4 g of L-arginine, 0.54 of L-glutamic acid, 0.54 g of L-alanine and 2.02 of other amino acids), 1 g of GMP, 0.7 of CMP, 0.3 of IMP, 10 g of $KH_2PO_4$, 10 g of $K_2HPO_4$, 10 g of NaCl, 1.5 g of glucose and 10 g of dextrin were dissolved in water to prepare 1.0 l of seasoning solution.

Separately, a crab shell extract was prepared using the leg parts of frozen crab shells by the following method: 500 g of the shells were pulverized and admixed with 3.0 l of water. The mixture was heated and boiled for 30 minutes with stirring. The boiled mixture was cooled and then filtered to separate the solution from the residue. The residue was extracted with 3.0 l of ethanol while being heated and was refluxed at 80° C. for one hour. The extracted solution was cooled and filtered into a solution and a sediment. The filtered solution obtained from ethanol extraction was admixed with the filtered solution obtained from the water extraction of the crab shells and 520 ml of crab shell extract was obtained (1.92 wt./vol.% of dry matter concentration). A 429 ml amount of the crab shell extract was added to 1.0 l of the seasoning solution, which was then boiled and aged at 95° C. for 60 minutes. After the boiling and aging, the solution was concentrated at 60° C. under reduced pressure into 165 g of seasoning composition (A) in the form of paste, the dry matter concentration of which was 62% (wt./vol.).

Separately, a broth of natural crab meat was prepared by the following method: A 150 g amount of frozen crab leg meat was defrosted and homogenized with 250 ml of water. The homogenized mixture was heated for 15 minutes with stirring in a water bath and centrifuged to obtain a clean solution at the top. The sediment was extracted twice in the same manner as described above with 100 ml of water, and the clean top portion of the same was added to the above-obtained clean solution and the combined solutions were concentrated under reduced pressure to yield 150 ml of natural crab meat broth (4.59% (wt./vol.) of dry matter concentration).

As a control, the above seasoning solution without the crab shell extract was prepared.

Seasoning (A), the control and the natural crab meat broth were organolepticly tested by a panel of 50 members who had been specifically trained for this kind of test using the sample solutions of 4.59% (wt./vol.) dry matter concentration of seasoning (A), the control and the broth.

The panel test was performed by a comparison (Seasoning (A)—the broth and control—the broth) with the sample solutions. The results obtained are shown in Table 1.

TABLE 1

|  | Seasoning (A) | Control |
| --- | --- | --- |
| Taste (compared with the broth) | almost the same | almost the same |
| Scent (compared with the broth) | almost the same | poor |
| Thickness (compared with the broth) | almost the same | poor |
| Natural feeling (compared with the broth) | rich | poor |

As can be seen from Table 1, Seasoning (A) abundant in natural feeling has not only a taste but also a scent and thickness very similar to that of the natural crab meat broth and was significantly preferred to the control by the panel.

EXAMPLE 2

667 g amount of pulverized crab shells was admixed with the seasoning solution obtained in example 1 and the admixture was boiled and aged at 95° C. for 60 minutes with stirring. Subsequently, the mixture was filtered into 970 ml of filtered solution and a residue. The residue was washed in 200 ml of water and the wash water was admixed with the filtered solution. The mixed solution was concentrated under reduced pressure and 173 g of Seasoning composition (B) was obtained (the dry matter concentration was 65% (wt./vol.)).

Seasoning composition (B) and the broth obtained in Example 1 were organolepticly tested in the same manner as described in Example 1.

The results were that all of the members of the panel pointed out that Seasoning (B) was almost the same as the broth in taste, scent, thickness and natural feeling.

EXAMPLE 3

A 22 g amount of glycine, 11 g of arginine, 10 g of L-glutamic acid, 5.5 g of DL-alanine, 1.5 g of GMP, 0.7 g of CMP, 10 g of $KH_2PO_4$, 10 g of $K_2HPO_4$, 10 g of NaCl and 1.2 g of glucose were dissolved in water to prepare 1.0 l of a seasoning solution. A 200 ml quantity of the crab shell extract obtained in Example 1 (the dry matter concentration of which was 1.92% (wt./vol.)) was admixed with the seasoning solution. The admixture was concentrated under reduced pressure and frozen into 81.4 g of Seasoning composition (C).

Seasoning composition (C) was organolepticly tested in the same manner as described in Example 1. The results were that in comparison to the crab meat broth obtained in Example 1, Seasoning (C) had a taste almost equivalent to that of the broth, a slightly weak scent, thickness and natural feeling. However, all of the members of the panel pointed out that its quality was still sufficient to allow its use as a practical seasoning agent.

EXAMPLE 4

A 252.7 g amount of glycine, 234.9 g of L-arginine, 75.9 g of L-alanine, 7.7 g of L-glutamic acid, 2.5 g of GMP, 152.5 g of potassium chloride, 43.8 g of monosodium phosphate anhydride and 230.8 g of disodium phosphate were finely ground and mixed into the seasoning composition. A 980 g amount of the seasoning composition was admixed with 161.7 g of finely ground citric acid. (The pH of the solution wherein 2 g of the admixture was dissolved in 100 ml of distilled water was 6.6). A 1141.7 g amount of the admixture was admixed with 239 g of powdered synthetic crab aromatic "AN-2547" (produced by T. Hasegawa Co.) and Seasoning composition (D) was obtained.

The flavor of the solution wherein 3.52 g of Seasoning composition and 1.5 g of table salt were dissolved in 100 ml of distilled water was equivalent to that of the natural crab meat obtained in Example 1.

Having now fully described this invention, it will be apparent to one of ordinary skill in the art that many changes and modifications can be made thereto without departing from the spirit or scope of the invention as set forth herein.

What is claimed as new and desired to be secured by Letters Patent of the United States is:

1. A crab meat flavored seasoning composition, comprising:
    (a) not less than 50% by wt. of amino acids,
    (b) not less than 2% by wt. of 5'-nucleotides,
    (c) not less than 30% by wt. of inorganic salts,
    (d) not less than 1% by wt. of glucides and
    (e) a substantial amount of crab shell extract or synthetic crab aromatics; said amino acids comprising not less than 40% by wt. of glycine, not less than 40% by wt. of arginine and glutamic acid and not less than 10% by wt. of alanine, said 5'-nucleotides comprising not less than 50% by wt. of GMP and said inorganic salts comprising not less than 20% by wt. of potassium ion, not less than 40% by wt. of phosphate ion and not more than 40% by wt. of sodium and chlorine ions.

2. The composition of claim 1, wherein said amino acids are essentially derived from HAP and/or HVP.

3. The composition of claim 1, wherein said 5'-nucleotides consist of said amount of GMP and at least one 5'-nucleotide selected from the group consisting of CMP, AMP and IMP.

4. The composition of claim 3, wherein said glucide is inverted sugar and/or liquid sugar.

5. The composition of claim 1, wherein said glucide is glucose.

6. The composition of claim 1, wherein said inorganic salts are sodium chloride and potassium phosphate.

7. The composition of claim 1, wherein the dry weight of crab shell extract is from 2 to 20% by wt. of that of components (a), (b), (c) and (d).

8. The composition of claim 1, wherein said crab shell extract is a hot-water extract, an organic-solvent extract or a dilute-acid extract.

9. The composition of claim 1, wherein said composition is in the form of a liquid, paste, powder or granular mixture.

10. A process for producing the composition of claim 1, comprising: mixing said components (a), (b), (c) and (d) in water with crushed crab shells; and heating the mixture.

11. The process of claim 10, wherein said components (a), (b), (c), (d) and (e) are dissolved in water and the mixture is heated at a temperature in the range from 80° C. to 120° C. for 30 to 120 minutes.

12. A process for producing the composition of claim 1, comprising: (1) extracting crushed crab shells with hot water thereby forming an aqueous extract and a crushed crab shell residue; (2) separating said aqueous extract from said crushed crab shell residue; (3) extracting said residue with a solvent under heat thereby obtaining a solvent extract; (4) mixing the solvent extract with said aqueous extract; (5) admixing the mixture with said components (a), (b), (c) and (d); and (6) heating the admixture.

13. The process of claim 12, wherein in step (6) the admixture is heated in a temperature range of 80° C. to 120° C. for 30 to 120 minutes.

14. The process of claim 12, wherein said solvent is ethanol.

15. The process of claim 12, wherein said solvent is water or dilute acid.

16. The process of claim 10, 11, 12, 13, 14 or 15, wherein the liquid product obtained is further concentrated.

17. The process of claim 16, wherein the concentrated composition is further dried and converted to a powder or granular mixture.

* * * * *